United States Patent
Um et al.

(10) Patent No.: US 11,899,325 B2
(45) Date of Patent: Feb. 13, 2024

(54) LIQUID CRYSTAL DISPLAY PANEL AND DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventors: Yoonsung Um, Shenzhen (CN); Lixia Li, Shenzhen (CN); Bangyin Peng, Shenzhen (CN); Yingchun Zhao, Shenzhen (CN); Fen Long, Shenzhen (CN); Qiqi Zhang, Shenzhen (CN)

(73) Assignee: SHENZHEN CHINA STAR OPTOELECTRONICS SEMICONDUCTOR DISPLAY TECHNOLOGY, CO., LTD., Shenzhen (CN)

( * ) Notice: Subject to any disclaimer, the term of this patent is extended or adjusted under 35 U.S.C. 154(b) by 236 days.

(21) Appl. No.: 17/438,658

(22) PCT Filed: Jul. 23, 2021

(86) PCT No.: PCT/CN2021/108099
§ 371 (c)(1),
(2) Date: Sep. 13, 2021

(87) PCT Pub. No.: WO2023/283994
PCT Pub. Date: Jan. 19, 2023

(65) Prior Publication Data
US 2023/0205025 A1    Jun. 29, 2023

(30) Foreign Application Priority Data
Jul. 13, 2021 (CN) .......... 202110787207.8

(51) Int. Cl.
*G02F 1/1362* (2006.01)
*G02F 1/1368* (2006.01)

(52) U.S. Cl.
CPC ...... *G02F 1/136286* (2013.01); *G02F 1/1368* (2013.01); *G02F 1/136209* (2013.01)

(58) Field of Classification Search
CPC ......... G02F 1/136286; G02F 1/136209; G02F 1/1368
See application file for complete search history.

(56) References Cited

U.S. PATENT DOCUMENTS

2004/0246280 A1* 12/2004 Credelle .............. G09G 3/3648
345/692
2014/0210868 A1* 7/2014 Cho ..................... G09G 3/3648
345/92

FOREIGN PATENT DOCUMENTS

CN    101566744 A    10/2009
CN    102914923 A    2/2013
(Continued)

*Primary Examiner* — Hoan C Nguyen
(74) *Attorney, Agent, or Firm* — The Roy Gross Law Firm, LLC; Roy Gross (57) ABSTRACT

A liquid crystal display panel and a display device are disclosed. The liquid crystal display panel includes a pixel matrix composed of more than two sub-pixels. Three adjacent sub-pixels located in the same row have different colors, and all sub-pixels located in the same column have the same color. Each data line is connected to at least one pixel group successively. Each pixel group includes three sub-pixels with different colors, which are respectively located on both sides of the data line. In a pixel group, each data line is connected to three sub-pixels in sequence.

8 Claims, 7 Drawing Sheets

(56) References Cited

FOREIGN PATENT DOCUMENTS

| | | | |
|---|---|---|---|
| CN | 105788549 A | 7/2016 | |
| CN | 106067293 A | 11/2016 | |
| CN | 106932988 A | 7/2017 | |
| CN | 106991953 A | 7/2017 | |
| CN | 109709735 A | 5/2019 | |
| CN | 112086077 A | 12/2020 | |
| JP | 3448871 B2 | 9/2003 | |
| JP | 2005208522 A * | 8/2005 | |
| JP | 2008033324 A * | 2/2008 | ........... G09G 3/3655 |
| KR | 20130121388 A | 11/2013 | |
| KR | 20200050871 A | 5/2020 | |
| WO | WO-2014161237 A1 * | 10/2014 | ........... G02F 1/1368 |

\* cited by examiner

LIQUID CRYSTAL DISPLAY PANEL AND DISPLAY DEVICE

CROSS REFERENCE TO RELATED APPLICATIONS

This application is a US National Phase Application based upon an International Application No. PCT/CN2021/108099, filed on Jul. 23, 2021, which claims the priority of Chinese Patent Application No. 202110787207.8, entitled "LIQUID CRYSTAL DISPLAY PANEL AND DISPLAY DEVICE", filed on Jul. 13, 2021. The contents of the above referenced applications are incorporated herein by reference in their entirety.

FIELD OF THE INVENTION

The present disclosure relates to display technology field, and more particularly to a liquid crystal display panel and a display device

BACKGROUND

In a liquid crystal display (LCD) panel, due to the coupling between the data line and the pixels, the RGB pixels correspond to different degrees of coupling and color shifts appear, resulting in the existence of color crosstalk frames, which seriously affects the quality of the display screen.

SUMMARY

The purpose of the present invention is to provide a liquid crystal display panel and a display device to solve the technical problem of poor screen picture quality.

To achieve the above objectives, the present disclosure provides a liquid crystal display panel. The liquid crystal display panel includes a pixel matrix, two or more data lines parallel to each other, and two or more scan lines parallel to each other. The pixel matrix is composed of more than two sub-pixels. The colors of three adjacent sub-pixels located in the same row are different, and the colors of all sub-pixels located in the same column are the same. Each data line is located between two adjacent columns of sub-pixels. Each scan line is located between two adjacent rows of sub-pixels. Each data line is connected to at least one pixel group successively. Each pixel group includes three sub-pixels with different colors, which are respectively located on two sides of the data line. In the pixel group, each data line is connected to three sub-pixels in sequence.

Further, three sub-pixels in the same pixel group are located in three adjacent rows of the pixel matrix.

Further, the pixel group includes a first sub-pixel, a second sub-pixel, and a third sub-pixel. The first sub-pixel is located on a first side of the data line. The second sub-pixel is located on a second side of the data line. The third sub-pixel is located on the first side or the second side of the data line. The data line is located between the first sub-pixel and the second sub-pixel adjacent to each other.

Further, the pixel group includes a first sub-pixel, a second sub-pixel, and a third sub-pixel. The first sub-pixel is located on a first side or a second side of the data line. The second sub-pixel is located on the first side of the data line. The third sub-pixel is located on the second side of the data line. The data line is located between the second sub-pixel and the third sub-pixel adjacent to each other.

Further, the pixel group includes a first sub-pixel, a second sub-pixel, and a third sub-pixel. The first sub-pixel is located on a first side of a data line. The second sub-pixel is located on the first side or a second side of the data line. The third sub-pixel is located on the second side of the data line. The data line is located between the first sub-pixel and the third sub-pixel adjacent to each other.

Further, the liquid crystal display panel further includes a first driving unit and a second driving unit. The first driving unit is electrically connected to the data lines and inputs grayscale voltages to a plurality of the data lines. The second driving unit is electrically connected to the scan lines and inputs scan signals to a plurality of the scan lines.

Further, when the first driving unit inputs the grayscale voltages to the data line, the polarities of the grayscale voltages of the pixel groups connected to the data line are the same, and the polarities of the grayscale voltages of the pixel groups connected to the data lines on both sides of the data line are opposite to the polarities of the grayscale voltages of the pixel groups connected to the data line.

Further, the number of the sub-pixels of the three colors is equal.

Further, the liquid crystal display panel further includes a thin film transistor. The gate of the thin film transistor is electrically connected to the corresponding scan line. The source of the thin film transistor is electrically connected to the corresponding data line. The drain of the thin film transistor is electrically connected to the corresponding sub-pixel.

To achieve the above objectives, the present disclosure also provides a display device. The display device includes the liquid crystal display panel and a backlight module. The backlight module includes a light-emitting surface. The liquid crystal display panel is disposed on the light-emitting surface of the backlight module.

The technical effect of the present disclosure is to provide a liquid crystal display panel and a display device, the liquid crystal display panel includes a pixel structure that can realize three pixel-inversions. Any data line of the pixel structure can drive three sub-pixels with different colors and located in different columns at the same time by crossing the lines. The original charging sequence is changed from R (red sub-pixel)→G (green sub-pixel) to R (red sub-pixel)→G (green sub-pixel)→B (blue sub-pixel) to ensure the uniformity of the sub-pixel charging, and that the sub-pixels are arranged in bright and dark staggered after being coupled by the data line, which equalizes the brightness of the display, thereby effectively solving the problem of color crosstalk and improving the quality of the LCD panel.

DETAILED DESCRIPTION OF PREFERRED EMBODIMENTS

Specifically, the terminologies in the embodiments of the present disclosure are merely for describing the purpose of the certain embodiment, but not to limit the invention. Examples and the appended claims be implemented in the present disclosure requires the use of the singular form of the book "a", "an" and "the" are intended to include most forms unless the context clearly dictates otherwise. It should also be understood that the terminology used herein that "and/or" means and includes any or all possible combinations of one or more of the associated listed items.

Figure 1:
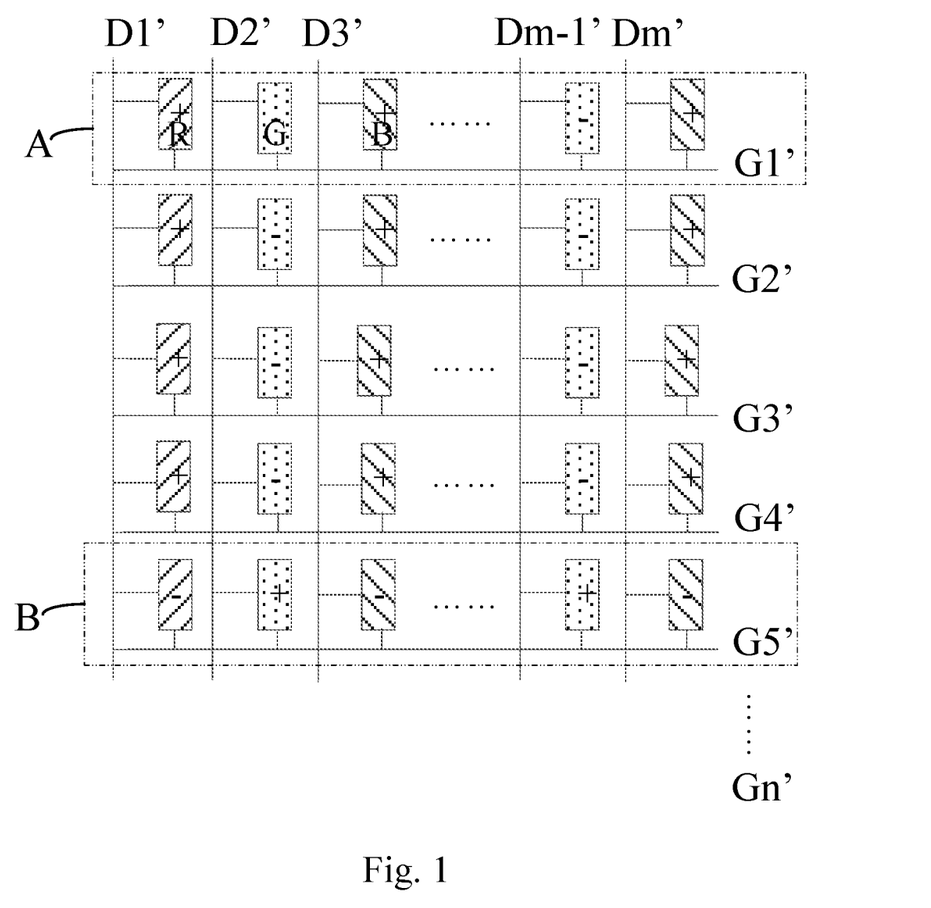
FIG. 1 is a schematic diagram of the pixel structure commonly used at present.
Figure 2:
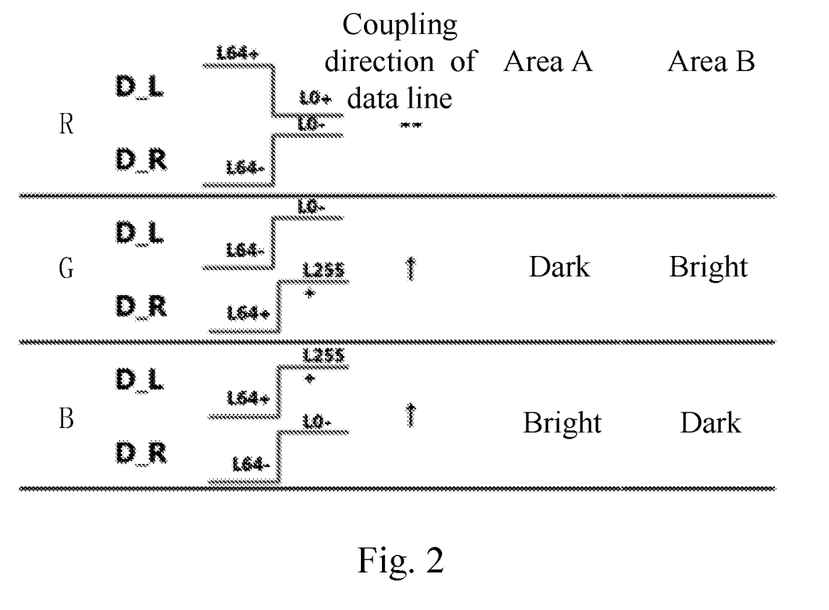
FIG. 2 is a timing diagram of the coupling of the red, green, and blue (RGB) sub-pixels in FIG. 1.

FIG. 1 is a schematic diagram of the pixel structure commonly used at present and FIG. 2 is a timing diagram of the coupling of the red, green and blue (RGB) sub-pixels in FIG. 1.

As shown in FIGS. 1-2, in the vertical stripe (Column+ Stripe) pixel structure, the liquid crystal display panel includes m data lines D1'-Dm' (dataline) and n scan lines G1'-Gn' (Gateline). The m data lines are arranged in the vertical direction, n scan lines are arranged in the horizontal direction, and the data lines and scan lines intersect to form a plurality of arrayed sub-pixels.

Usually, the vertical direction is the sub-pixels of the same color, and the horizontal direction is cyclically arranged in the order of red sub-pixels (R), green sub-pixels (G), and blue sub-pixels (B).

A data line is connected to the sub-pixels of the same column, and the grayscale voltage transmitted on the data line (D1'-Dm') takes the common voltage Vcom as the reference voltage. The grayscale voltage can be divided into positive grayscale voltage (+) and negative grayscale voltage (−). The positive grayscale voltage means that the actual grayscale voltage transmitted on the data lines (D1'-Dm') is higher than the common voltage Vcom, and the negative-polarity grayscale voltage refers to the actual grayscale voltage transmitted on the data lines (D1'-Dm') is lower than the common voltage Vcom.

Specifically, at area A, the R sub-pixel maintains the grayscale voltage of L64+. The signal change of the data line D1' on the left side of the R sub-pixel is: L64→L0+, and the signal change of the data line D2' on the right side of the R sub-pixel is: L64−→L0−. At this time, the amounts of coupling of the left data line D1' and the right data line D2' to the R sub-pixel are the same, so that the voltage of the R sub-pixel at area A remains unchanged.

At area A, the G sub-pixel maintains the grayscale voltage of L64−. The signal change of the data line D2' on the left of the G sub-pixel is: L64−→L0−, and the signal change of the data line D3' on the right of the G sub-pixel is: L64+→L255+. At this time, both the left data line D2' and the right data line D3' have a voltage upward trend to the G sub-pixel, so that the G sub-pixel at area A becomes dark.

At area A, the B sub-pixel maintains the grayscale voltage of L64+. The signal change of the data line D3' on the left of the B sub-pixel is: L64+→L255+, and the signal change of the data line D4' on the right of the B sub-pixel is: L64+→L0+. At this time, the amounts of coupling of the left data line D3' and the right data line D4' to the B sub-pixel are different. The coupling of the left data line D3' to the B sub-pixel has a greater pull-up effect, so that the voltage of the B sub-pixel is pulled up (i.e., the amount of pull-up on the left is greater than the amount of pull-down on the right), and the B sub-pixel at area A becomes brighter.

At area B, the R sub-pixel maintains the grayscale voltage of L64+. The signal change of the data line D1' on the left side of the R pixel is: L64→L0+, and the signal change of the data line D2' on the right side of the R sub-pixel is: L64−→L0−. At this time, the amounts of coupling of the left data line D1' and the right data line D2' to the R sub-pixel are the same, so that the voltage of the R sub-pixel at area A remains unchanged.

At area B, the G sub-pixel maintains the grayscale voltage of L64−. The signal change of the data line D2' on the left of the G sub-pixel is: L64−→L0−, and the signal change of the data line D3' on the right of the G sub-pixel is: L64+→L255+. At this time, both the left data line D2' and the right data line D3' have a voltage upward trend to the G sub-pixel, so that the G sub-pixel at area A becomes brighter.

At area B, the B subpixel maintains the grayscale voltage of L64+. The signal change of the data line D3' on the left of the B subpixel is: L64+→L255+, and the signal change of the data line D4' on the right of the B subpixel is: L64+→L0+. At this time, the amounts of coupling of the left data line D3' and the right data line D4' to the B pixel are different. The coupling of the left data line D3' to the B sub-pixel has a greater pull-up effect, so that the voltage of the B sub-pixel is pulled up and the B sub-pixel at area A becomes darker.

It should be noted, in FIG. 2, "D_L" refers to the left side of the data line and "D_R" refers to the right side of the data line.

Therefore, when the pixel structure is driven in such a way that the gate opening sequence is: G1', G2', G3'. . . Gn', the RGB pixels are coupled by the data line to a different degree, so a block color change on the screen appears.

The present disclosure provides a liquid crystal display panel. The liquid crystal display panel includes a pixel structure that can realize three pixel-inversions. Any data line of the pixel structure can drive three sub-pixels with different colors and located in different columns at the same time by crossing the lines. The original charging sequence is changed from R (red sub-pixel)→G (green sub-pixel) to R (red sub-pixel)→G (green sub-pixel)→B (blue sub-pixel) to ensure the uniformity of the sub-pixel charging, and that the sub-pixels are arranged in bright and dark staggered after being coupled by the data line, which equalizes the brightness of the display, thereby effectively solving the problem of color crosstalk and improving the quality of the LCD panel.

Figure 3:
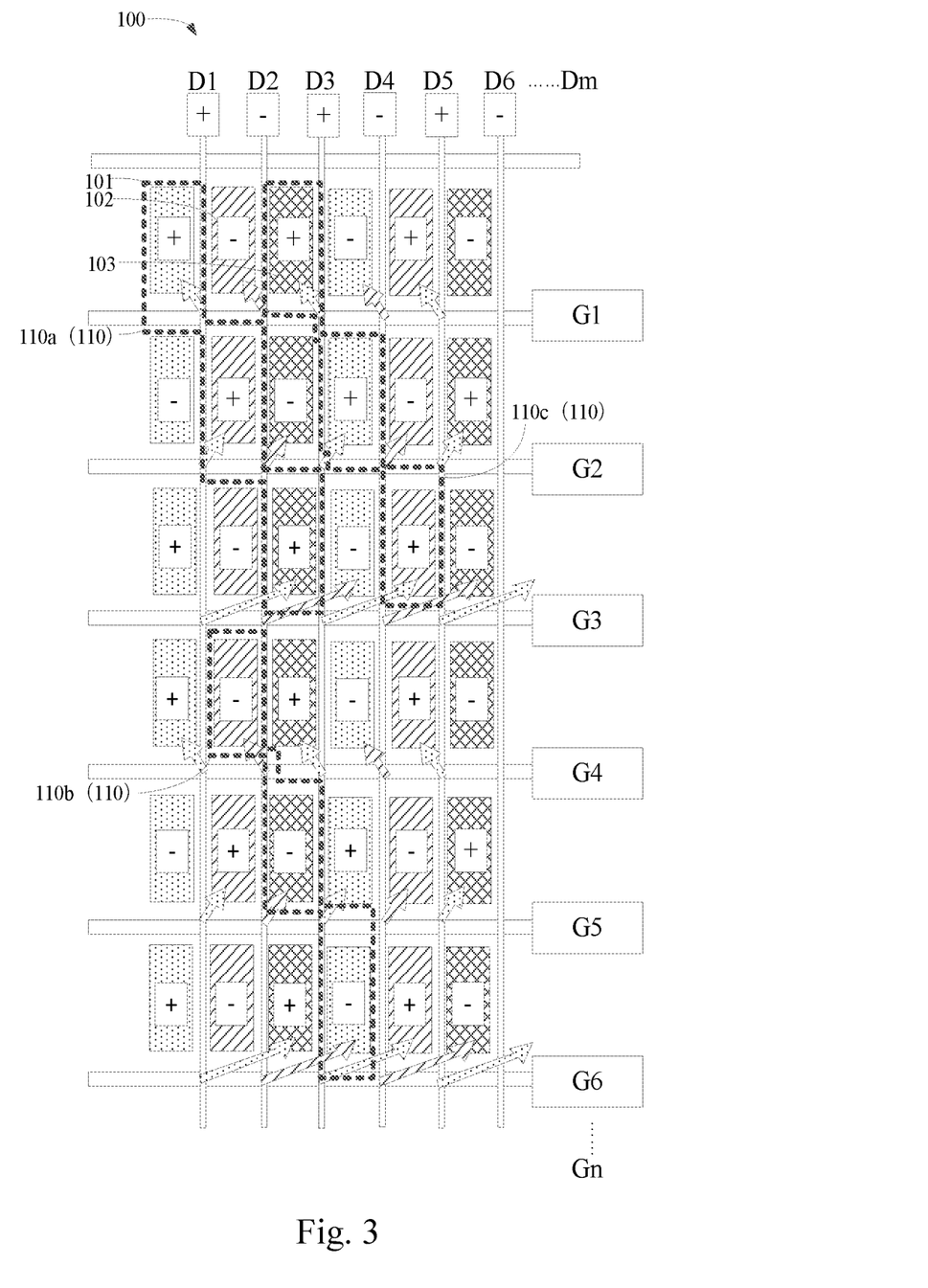
FIG. 3 is a schematic structural diagram of a pixel structure according to one embodiment of the present disclosure.

FIG. 3 is a schematic structural diagram of a pixel structure according to one embodiment of the present disclosure.

As depicted in FIG. 3, the pixel structure 100 includes a pixel matrix 10, which is composed of more than two sub-pixels. Three adjacent sub-pixels located in the same row have different colors, and all sub-pixels located in the same column have the same color. The sub-pixels include a first sub-pixel 101, a second sub-pixel 102, and a third sub-pixel 103 of different colors. The first sub-pixel 101 is a red pixel, the second sub-pixel 102 is a green sub-pixel, and the third sub-pixel 103 is a blue sub-pixel.

The pixel structure 100 also includes m parallel data lines D1, D2, D3, . . . (Dm-2), (Dm-1), and Dm, and n mutually parallel scan lines G1, G2, G3, . . . (Gn-2), (Gn-1), and Gn. The data lines extend in the vertical direction and are arranged at intervals in the horizontal direction. Each data line is located between two adjacent columns of sub-pixels. The scan lines that are perpendicular to the data lines extend in the horizontal direction and are arranged at intervals in the vertical direction. Each scan line is located between two adjacent rows of sub-pixels.

In this embodiment, a plurality of first sub-pixels 101 are arranged in a matrix to form a first column of pixels and are located on the left side of the first data line D1. A plurality of second sub-pixels 102 are arranged in a matrix to form a second column of pixels and are located on the left side of the data line D2. A plurality of third sub-pixels 103 are arranged in a matrix to form a third column of pixels and are located on the left side of the third data line D3, and a plurality of first sub-pixels 101 are arranged in a matrix to form a fourth column of pixels and are located on the left side of the fourth data line D4. To be brief, all sub-pixels in the same column have the same color, and three sub-pixels with different colors in the row direction are cyclically arranged in the order of the first sub-pixel 101, the second sub-pixel 102, and the third sub-pixel 103, or in the order of the second sub-pixel 102, the third sub-pixel 103, and the first sub-pixel 101, or in the order of the third sub-pixel 103, the first sub-pixel 101, and the second sub-pixel 102.

In this embodiment, each data line is connected to at least one pixel group 110 in sequence. Each pixel group 110 includes three sub-pixels with different colors. The three sub-pixels in the same pixel group 110 are located in the adjacent three rows of the pixel matrix 10.

In FIG. 3, the first sub-pixel 101 is located on the left side of the first data line D1, the second sub-pixel 102 is located on the right side of the first data line D1, and the third sub-pixel 103 is also located on the right side of the first data line Dl. The first data line D1 is located between the first sub-pixel 101 and the second sub-pixel 102 that are adjacent to each other.

In this embodiment, the first data line D1 is connected to two first pixel groups 110a. In each first pixel group 110a, the first data line D1 is first connected to the first sub-pixel 101 of the first column of pixels, then connected to the second sub-pixel 102 of the second column of pixels, and finally connected to the third sub-pixel 103 of the third column of pixels. In general, the first data line D1 is connected to at least one first pixel group 110a. In each first pixel group 110a, the first data line D1 sequentially connects three sub-pixels with different colors in the order of the first sub-pixel 101, the second sub-pixel 102, and the third sub-pixel 103.

The second sub-pixel 102 is located on the left side of the second data line D2, the third sub-pixel 103 is located on the right side of the second data line D2, and the first sub-pixel 101 is also located on the right side of the second data line D2. The second data line D2 is located between the second sub-pixel 102 and the third sub-pixel 103 that are adjacent to each other.

In this embodiment, the second data line D2 is connected to two second pixel groups 110b. In each second pixel group 110b, the second data line D2 is first connected to the second sub-pixel 102 of the second column of pixels, then connected to the third sub-pixel 103 of the third column of pixels, and finally connected to the first sub-pixel 101 of the fourth column of pixels. In general, the second data line D2 is connected to at least one second pixel group 110b. In each second pixel group 110b, the second data line D2 sequentially connects three sub-pixels with different colors in the order of the second sub-pixel 102, the third sub-pixel 103, and the first sub-pixel 101.

The third sub-pixel 103 is located on the left side of the third data line D3, the first sub-pixel 101 is located on the right side of the third data line D3, and the second sub-pixel 102 is also located on the right side of the third data line D3. The third data line D3 is located between the third sub-pixel 103 and the first sub-pixel 101 that are adjacent to each other.

In this embodiment, the third data line D3 is connected to two third pixel groups 110c. In each third pixel group 110c, the third data line D3 is first connected to the third sub-pixel 103 of the third column of pixels, then connected to the first sub-pixel 101 of the fourth column of pixels, and finally connected to the second sub-pixel 102 of the fifth column of pixels. In general, the third data line D3 is connected to at least one third pixel group 110c. In each third pixel group 110c, the third data line D3 sequentially connects three sub-pixels with different colors in the order of the third sub-pixel 103, the first sub-pixel 101, and the second sub-pixel 102.

In a pixel group, the numbers of the sub-pixels of the three colors are equal. That is, in a pixel group, the numbers of the first sub-pixel 101, the second sub-pixel 102, and the third sub-pixel 103 are equal.

Figure 4:
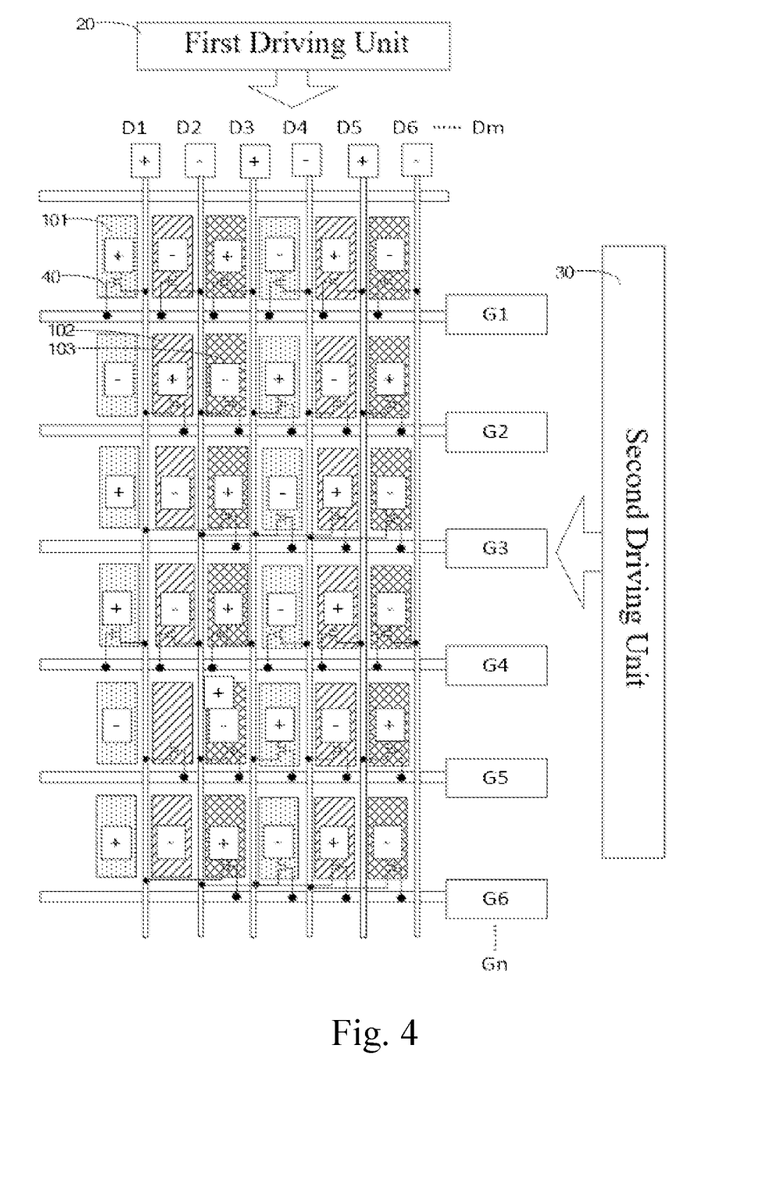
FIG. 4 is a schematic diagram of driving a pixel structure according to one embodiment of the present disclosure.

FIG. 4 is a schematic diagram of driving a pixel structure according to one embodiment of the present disclosure.

As shown in FIG. 4, in this embodiment, the pixel structure 100 further includes a first driving unit 20 and a second driving unit 30. The first driving unit 20 is a source driver, and the second driving unit 30 is a gate driver, such as a GOA drive circuit.

The first driving unit 20 is electrically connected to the data lines, and inputs grayscale voltages to a plurality of data lines column by column. The grayscale voltage includes a positive polarity grayscale voltage (+) and a negative polarity grayscale voltage (−). The second driving unit 30 is electrically connected to the scan lines, and inputs scan signals to a plurality of scan lines row by row. When the first driving unit 20 inputs a positive grayscale voltage to a data line, the pixel group connected to this data line is in the bright state. When the first driving unit 20 inputs a negative grayscale voltage to a data line, the pixel group connected to this data line is in the dark state.

In this embodiment, when the first driving unit 20 inputs the grayscale voltages to the data lines and the second driving unit 30 inputs the scan signals to the scan lines G1, G2, G3, . . . (Gn-2), (Gn-1), and Gn row by row, the polarities of the grayscale voltages of the pixel groups connected to a data line are the same, and the polarities of the grayscale voltages of the pixel groups connected to the data lines on both sides of this data line are opposite to the polarities of the grayscale voltages of the pixel groups connected to this data line.

The pixel structure 100 further includes a thin film transistor 40, which is disposed in the pixel area of each sub-pixel, the gate of which is electrically connected to the corresponding scan line, the source of which is electrically connected to the corresponding data line, and the drain of which is electrically connected to the corresponding sub-pixel.

Figure 5:
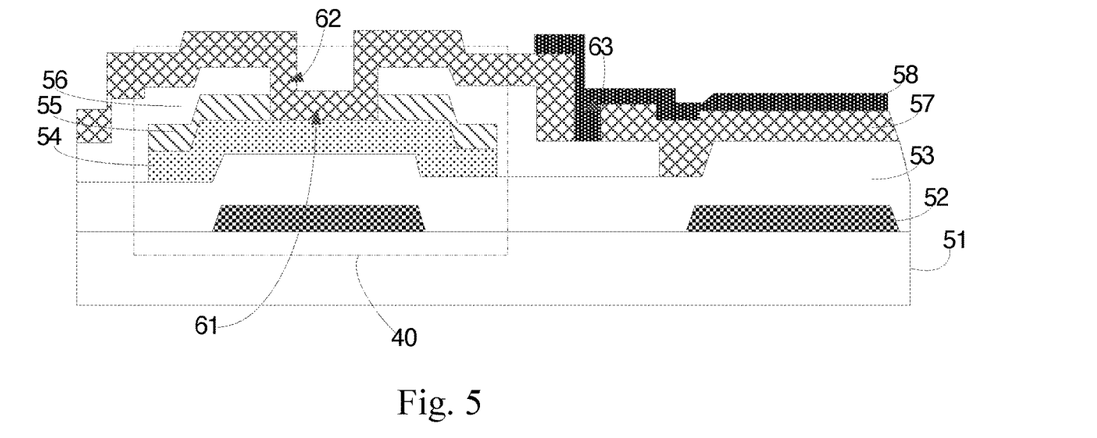
FIG. 5 is a schematic structural diagram of an array substrate according to one embodiment of the present disclosure.
Figure 6:
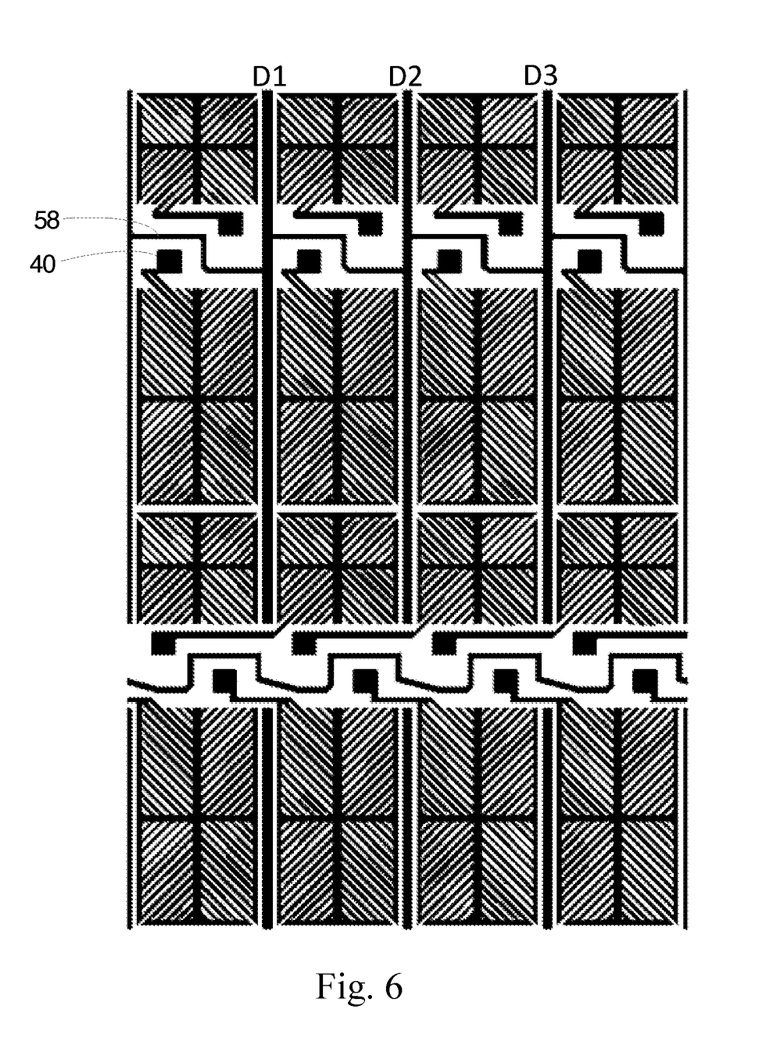
FIG. 6 is a plan view of a pixel structure according to one embodiment of the present disclosure.

FIG. 5 is a schematic structural diagram of an array substrate provided by an embodiment of the application; FIG. 6 is a plan view of a pixel structure provided by an embodiment of the application.

FIG. 5 is a schematic structural diagram of an array substrate according to one embodiment of the present disclosure, and FIG. 6 is a plan view of a pixel structure according to one embodiment of the present disclosure.

As shown in FIG. 5, the display panel provided by this embodiment includes an array substrate with a plurality of thin film transistors 40. The array substrate includes a base

51, a gate layer 52, a gate insulating layer 53, a first contact layer 54, a second contact layer 55, a source and drain layer 56, an insulating layer 57, and a pixel electrode 58 from bottom to top.

Specifically, the gate layer 52 is disposed on the base 51. The gate insulating layer 53 covers the gate layer 52 and extends to the surface of the base 51. The first contact layer 54 is disposed on the gate insulating layer 53, and facing the gate layer 52. The gate layer 52 forms a scan line of the display panel. The insulating layer 55 is disposed on the first contact layer 54, and located on both sides of the first contact layer 54, so that the second contact layer 55 has a first through hole 61. The second contact layer 55 is a semiconductor layer. The first contact layer 54 and the second contact layer 55 form an active layer. The source and drain layer 56 is disposed on the second contact layer 55, and extends from the surface of the second contact layer 55 to the surface of the gate insulating layer 53. The source and drain layer 56 includes a source on the left and a drain on the right, which are disposed at intervals through a second through hole 62. The source and drain layer 56 forms the data line of the display panel.

The insulating layer 57 is disposed on the source and drain layer 56 and the gate insulating layer 53, and fills the first through hole 61 and the second through hole 62. The insulating layer 57 also includes a third through hole 63. The third through hole 63 penetrates to the drain. The pixel electrode 58 is disposed on the insulating layer 57, and is connected to the drain through the third through hole 63. The pixel electrode 58 is the common electrode of each sub-pixel. Please refer FIG. 6, the common electrode is connected to the data lines (drain wiring) by crossing lines. That is, the common electrode is directly crossed to the data lines of the thin film transistor 40 (TFT) of the adjacent sub-pixel. For the same data line, the cross-column driving is realized without changing the winding of the data lines.

In this embodiment, the charging path of the sub-pixels connected to the same data line may be: R→G→B→R→G→B, G→B→R→G→B→R, or B→R→G→B→R→G.

The operating state of the pixel structure 100 in this embodiment will be described in detail below.

The second driving unit 30 (GOA driving circuit) outputs scan signals in an operation sequence of 60 Hz to drive a plurality of scan lines (Gate). That is, the driving order of the GOA is: CK1→CK2→CK3→CK4→CK5→CK6 . . . → CKn, and the opening order of the gate is: G1→G2→G3→G4→G5→G6 . . . →Gn.

Please refer to FIG. 4, during operation, input data signals to the data lines D1, D2, D3, . . . (Dm-2), (Dm-1), and Dm, and input scan signals CK1, CK2, CK3 . . . CKn to scan lines G1, G2, G3, . . . (Gn-2), (Gn-1), and Gn row by row. That is, turn on the thin film transistors connected with G1, G2, G3 . . . (Gn-2), (Gn-1), and Gn in turn.

Figure 7:
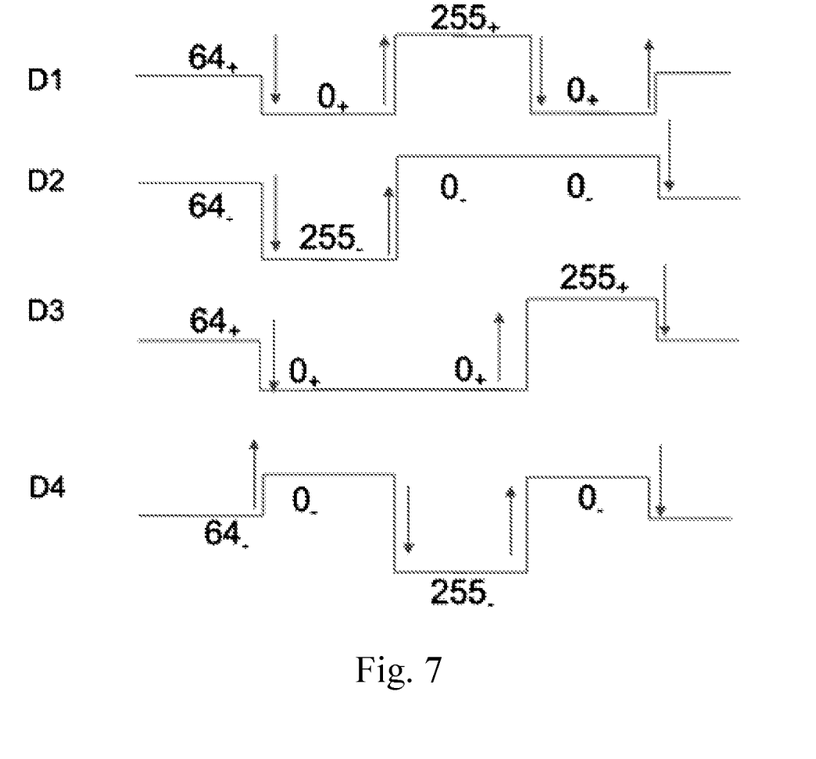
FIG. 7 is a timing diagram of the data lines D1, D2, D3, and D4 in FIG. 4.

FIG. 7 is a timing diagram of the data lines D1, D2, D3, and D4 in FIG. 4.

As shown in FIGS. 4 and 7, when the LCD panel displays the L64 white screen as the background and the L255 blue frame, one data line transmits a signal to at least one pixel group.

When the first data line D1 is connected to the positive grayscale voltage, the signal change of D1 is: L64+→L0+→L255+. The first sub-pixel 101, the second sub-pixel 102, and the third sub-pixel 103 are all kept at the grayscale voltage of L64+.

When the second data line D2 is connected to the negative grayscale voltage, the signal change of D2 is: L64-→ L255-→L0-. The second sub-pixel 102, the third sub-pixel 103, and the first sub-pixel 101 are all kept at the grayscale voltage of L64-.

When the third data line D3 is connected to the positive grayscale voltage, the signal change of D3 is: L64+→L0+→L255+. The third sub-pixel 103, the first sub-pixel 101, and the second sub-pixel 102 are all kept at the grayscale voltage of L64+.

When the fourth data line D4 is connected to the negative grayscale voltage, the signal change of D4 is: L64-→L0-→L255-. The first sub-pixel 101, the second sub-pixel 102, and the third sub-pixel 103 are all kept at the grayscale voltage of L64-.

When the polarities of the grayscale voltage connected to the data lines D1, D2, D3, and D4 are ↓↑↑↓, the light and dark changing process of the third sub-pixel 103 is: B−bright/dark/dark/bright . . . B+dark/bright/bright/dark . . . .

When the polarities of the grayscale voltage connected to the data lines D1, D2, and D3 are ↓↑↓, the light and dark changing process of the first sub-pixel 101 is: R−unchanged/bright/dark/bright . . . R+unchanged/dark/bright/dark . . . .

The present disclosure provides a liquid crystal display panel. The liquid crystal display panel includes a pixel structure that can realize three pixel-inversions. Any data line of the pixel structure can drive three sub-pixels with different colors and located in different columns at the same time by crossing the lines. The original charging sequence is changed from R (red sub-pixel)→G (green sub-pixel) to R (red sub-pixel)→G (green sub-pixel)→B (blue sub-pixel) to ensure the uniformity of the sub-pixel charging, and that the sub-pixels are arranged in bright and dark staggered after being coupled by the data line, which equalizes the brightness of the display, thereby effectively solving the problem of color crosstalk and improving the quality of the LCD panel.

This embodiment also provides a display device, which includes the aforementioned liquid crystal display panel and a backlight module (not shown). The liquid crystal display panel is disposed on a light-emitting surface of the backlight module. The display device may be: electronic paper, mobile phones, tablet computers, TVs, monitors, laptops, digital photo frames, navigators, and other products or components with display functions.

In other embodiments, a pixel group includes a first sub-pixel, a second sub-pixel, and a third sub-pixel. In a pixel group, the first sub-pixel is located on the first side of a data line, the second sub-pixel is located on the second side of the data line, the third sub-pixel is located on the first side of the data line, and the data line is located between the first sub-pixel and the second sub-pixel adjacent to each other. Or, in a pixel group, the first sub-pixel is located on the second side of a data line, and the second sub-pixel is located on the first side of the data line, the third sub-pixel is located on the second side of the data line, and the data line is located between the second sub-pixel and the third sub-pixel adjacent to each other. Or in a pixel group. Or, in a pixel group, the first sub-pixel is located on the first side of a data line, the second sub-pixel is located on the second side of the data line, the third sub-pixel is located on the second side of the data line, and the data line is located between the first sub-pixel and the third sub-pixel adjacent to each other. It should be noted, the first side and the second side are relative to the two sides of a certain data line. Those skilled in the art can adjust according to the actual situation to connect the pixels of different colors in three adjacent columns and located in three adjacent rows, and it will not be repeated here.

The above is a detailed introduction to a display panel provided by the embodiment of the present disclosure. The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. A display device, comprising:
   a liquid crystal display panel, comprising:
      a pixel matrix, composed of more than two sub-pixels, wherein the colors of three adjacent sub-pixels located in the same row are different, and the colors of all sub-pixels located in the same column are the same;
      two or more data lines parallel to each other, each data line is located between two adjacent columns of sub-pixels; and
      two or more scan lines parallel to each other, each scan line is located between two adjacent rows of sub-pixels;
      wherein each data line is connected to at least one pixel group successively, each pixel group comprises three sub-pixels with different colors, which are respectively located on two sides of the data line, and in the pixel group, each data line is connected to three sub-pixels in sequence;
   a first driving unit, electrically connected to the data lines and inputs grayscale voltages to a plurality of the data lines;
   a second driving unit, electrically connected to the scan lines and inputs scan signals to a plurality of the scan lines; and
   a backlight module, comprising a light-emitting surface, wherein the liquid crystal display panel is disposed on the light-emitting surface of the backlight module,
   wherein when the first driving unit inputs the grayscale voltages to the data line, the polarities of the grayscale voltages of the pixel groups connected to the data line are the same, and the polarities of the grayscale voltages of the pixel groups connected to the data lines on both sides of the data line are opposite to the polarities of the grayscale voltages of the pixel groups connected to the data line,
   wherein when the first driving unit inputs a positive grayscale voltage to the data line, the pixel group connected to the data line is in a bright state.

2. The display device of claim 1, wherein three sub-pixels in the same pixel group are located in three adjacent rows of the pixel matrix.

3. The display device of claim 1, wherein the pixel group comprises:
   a first sub-pixel, located on a first side of the data line;
   a second sub-pixel, located on a second side of the data line; and
   a third sub-pixel, located on the first side or the second side of the data line;
   wherein the data line is located between the first sub-pixel and the second sub-pixel adjacent to each other.

4. The display device of claim 1, wherein the pixel group comprises:
   a first sub-pixel, located on a first side or a second side of the data line;
   a second sub-pixel, located on the first side of the data line; and
   a third sub-pixel, located on the second side of the data line;
   wherein the data line is located between the second sub-pixel and the third sub-pixel adjacent to each other.

5. The display device of claim 1, wherein the pixel group comprises:
   a first sub-pixel, located on a first side of a data line;
   a second sub-pixel, located on the first side or a second side of the data line; and
   a third sub-pixel, located on the second side of the data line;
   wherein the data line is located between the first sub-pixel and the third sub-pixel adjacent to each other.

6. The display device of claim 1, wherein when the first driving unit inputs a negative grayscale voltage to the data line, the pixel group connected to the data line is in a dark state.

7. The display device of claim 1, wherein the number of the sub-pixels of the three colors is equal.

8. The display device of claim 1, further comprising:
   a thin film transistor, wherein a gate of the thin film transistor is electrically connected to the corresponding scan line, a source of the thin film transistor is electrically connected to the corresponding data line, and a drain of the thin film transistor is electrically connected to the corresponding sub-pixel.

* * * * *